United States Patent
Hooli et al.

(10) Patent No.: US 9,900,888 B2
(45) Date of Patent: Feb. 20, 2018

(54) SUBFRAME BUNDLING

(71) Applicant: Nokia Solutions and Networks Oy, Espoo (FI)

(72) Inventors: Kari Juhani Hooli, Oulu (FI); Yuyu Yan, Beijing (CN); Timo Erkki Lunttila, Espoo (FI); Esa Tapani Tiirola, Kempele (FI); Pasi Eino Tapio Kinnunen, Oulu (FI)

(*) Notice: Subject to any disclaimer, the term of this patent is extended or adjusted under 35 U.S.C. 154(b) by 273 days.

(21) Appl. No.: 14/763,576

(22) PCT Filed: Jan. 28, 2013

(86) PCT No.: PCT/EP2013/051562
§ 371 (c)(1),
(2) Date: Jul. 27, 2015

(87) PCT Pub. No.: WO2014/114357
PCT Pub. Date: Jul. 31, 2014

(65) Prior Publication Data
US 2015/0373704 A1    Dec. 24, 2015

(51) Int. Cl.
*H04W 72/04* (2009.01)
*H04W 72/12* (2009.01)
*H04L 12/805* (2013.01)

(52) U.S. Cl.
CPC ......... *H04W 72/0446* (2013.01); *H04L 47/36* (2013.01); *H04W 72/1257* (2013.01); *H04W 72/1268* (2013.01)

(58) Field of Classification Search
CPC ......... H04W 72/0446; H04W 72/1257; H04W 72/1268; H04L 47/36; H04L 5/0053
See application file for complete search history.

(56) References Cited

U.S. PATENT DOCUMENTS

| | | | |
|---|---|---|---|
| 2009/0323617 A1 | 12/2009 | Che et al. | 370/329 |
| 2010/0165936 A1 | 7/2010 | Ray et al. | 370/329 |
| 2011/0141952 A1* | 6/2011 | Wang | H04L 1/1812 370/294 |

FOREIGN PATENT DOCUMENTS

WO    WO 2013/170876 A1    11/2013

OTHER PUBLICATIONS

3GPP TSG RAN WG1 Meeting #68, Dresden, Germany, Feb. 6-10, 2012, R1-120741, "Coverage enhancement for Medium data rate", Nokia Siemens Networks, Nokia, 3 pgs.

(Continued)

*Primary Examiner* — Paul H Masur
(74) *Attorney, Agent, or Firm* — Harrington & Smith

(57) ABSTRACT

The disclosure relates to subframe bundling in a system where subframe bundling is based on a set of bundling definitions. Control information is provided for at least one communication device configured to provide subframe bundling such that the control information is generated to be at least partially inconsistent with the set of bundling definitions. The control information is signaled to the at least one communication device to adjust the state of subframe bundling and/or size of subframe bundled transmission in accordance with a predefined rule by the at least one communication device. When the device receives the information, is determines that received control information is inconsistent with the set of bundling definitions. In response to the determination, the device can adjust the state of subframe bundling and/or size of subframe bundled transmission.

36 Claims, 6 Drawing Sheets

(56) References Cited

OTHER PUBLICATIONS

3GPP TSG RAN WG1 Meeting #69, Prague, Czech Republic, May 21-25, 2012, R1-122528, "Proposal on the conclusions for coverage enhancement", Huawei, HiSilicon, 5 pgs.

3GPP TSG RAN WG1 Meeting #69, Prague, Czech Republic, May 21-25, 2012, R1-123018, "TR36.824 V2.0.;0 LTE Coverage Enhancements", China Telecom (Rapporteur), 1 pg.

3GPP TR36.824 V2,0.0 (May 2012), "$3^{rd}$ Generation Partnership Project; Technical Specification Group Radio Access Network; Evolved Universal Terrestrial Radio Access (E-UTRA); LTE Coverage Enhancements (Release 11)", 17 pgs.

"$3^{rd}$ Generation Partnership Project; Technical Specification Group Radio Access Network; Evolved Universal Terrestrial Radio Access (E-UTRA); LTE coverage enhancements (Release 11)", 3GPP TR 36.824 V11.0.0, Jun. 2012, 18 pages.

\* cited by examiner

SUBFRAME BUNDLING

This disclosure relates to subframe bundling in a communication system.

A communication system provides a facility that enables communication sessions between two or more entities such as fixed or mobile communication devices, base stations, servers, machine type devices, and/or other communication nodes. A communication system and compatible communicating entities typically operate in accordance with a given standard and/or specification setting out how the various entities shall operate.

In a wireless communication system at least a part of the communication between at least two devices, or stations occurs over a wireless interface. Examples of wireless systems include public land mobile networks (PLMN) such as cellular networks, satellite based communication systems and different wireless local networks, for example wireless local area networks (WLAN). A wireless connection can also be provided by short range radio, for example based on the Bluetooth™ radio.

An example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Communications can be provided between appropriate communication devices. In a wireless system a communication device can provide a transceiver station that can communicate with another communication device. Examples of these include base stations of access networks and/or other user equipment. A communication device of a user is often referred to as user equipment (UE) or terminal. A communication device is provided with an appropriate signal receiving and transmitting arrangement for enabling communication of data and signalling with other parties.

Communications can be carried by means of an arrangement that is based on use of subframes. Subframe bundling has been proposed for medium data rate Physical Uplink Shared Channel (PUSCH). PUSCH subframe bundling, for example in association with a 3GPP LTE-Advanced system can be used to provide LTE coverage enhancement. Subframe or transmission time interval (TTI) bundling is defined in LTE Release 8 specifications as a method to increase uplink (UL) coverage. Each TTI may define one or more physical resource blocks (PRBs). The PRBs may be time-frequency resources to be used during the TTI. For example during an allocated TTI, a transmission may be made on a physical resource block comprising the allocated frequency. Bundling may be used to extend the coverage for example for Voice over Internet Protocol (VoIP) service.

In LTE release 8, TTI bundling is applicable for transport blocks (TBs) having a number of physical resource blocks (PRBs) that is below a given number (currently 4) and using Quarternary Phase Shift Keying (QPSK) modulation. The usage of LTE release 8 subframe bundling is intended in particular for cell edge situations where UE transmission can be power limited and achievable data rates are in the range of 20-80 kbit/s. Release 8 bundling is also optimised (e.g. in TB size definition) for a specific VoIP packet size. In LTE Release 11, TTI bundling enhancements are considered for medium data rate, i.e. for data rate in the rough range of 200-400 kbit/s. The enhancements aim to benefit from turbo coding gain and lower higher layer protocol overhead achievable with larger TB size. The aim is also in scenarios where UE transmission becomes power limited with PRB allocations wider than e.g. 4-6 PRBs.

A problem of transmission time interval (TTI) bundling enhancements is that not all packets need bundling. This may be for example the case for medium data rate (i.e. 384 kbps) and/or if many of the packets are associated with relatively short messages. An example relating to medium data rate services is web browsing in which uplink (UL) packets are mainly Hypertext Transport Protocol (HTTP) request and transport control protocol acknowledgements (TCP ACKs). Most of the packets containing HTTP requests can be large, for example 500 bytes or more, while most of the packets containing transport control protocol acknowledgements (TCP ACKs) are small, such as 144 bits or less. If bundling is applied to all packets, then the spectral efficiency may be severely reduced for a majority of web browsing packets. TTI bundling is semi-static, and is thus not suitable for handling dynamically alternating packet sizes. Furthermore, retransmissions during bundling operation may require relatively long transmission periods which need to be somehow addressed in case of changes in the transmission such as e.g. handovers or changes in subframe configuration.

Embodiments of the invention aim to address one or several of the above issues.

It is noted that the issues are not limited to any particular communication system, standard, protocol, specification, radios and so forth, but may occur in any communication device and/or system where subframe bundling is used.

In accordance with an embodiment there is provided a method for controlling subframe bundling in a system where subframe bundling is based on a set of bundling definitions, comprising generating control information for at least one communication device configured to provide subframe bundling, wherein the control information is generated to be at least partially inconsistent with the set of bundling definitions, and sending the control information to the at least one communication device to adjust the state of subframe bundling and/or size of subframe bundled transmission in accordance with a predefined rule by the at least one communication device.

In accordance with an embodiment there is provided a method for a communication device configured to provide subframe bundling based on a set of bundling definitions, comprising determining that received control information is inconsistent with the set of bundling definitions, and in response to the determination, adjusting the state of subframe bundling and/or size of subframe bundled transmission in accordance with a predefined rule.

In accordance with an embodiment there is provided an apparatus for controlling subframe bundling in a system where subframe bundling is based on a set of bundling definitions, the apparatus comprising at least one processor, and at least one memory including computer program code, wherein the at least one memory and the computer program code are configured, with the at least one processor, to generate control information for at least one communication device configured to provide subframe bundling, wherein the control information is generated to be at least partially inconsistent with the set of bundling definitions, and cause sending of the control information to the at least one communication device to adjust the state of subframe bundling and/or size of subframe bundled transmission in accordance with a predefined rule by the at least one communication device.

In accordance with an yet further embodiment there is provided an apparatus for a communication device configured to provide subframe bundling based on a set of bundling definitions, the apparatus comprising at least one processor, and at least one memory including computer program code, wherein the at least one memory and the computer program code are configured, with the at least one processor, to determine that received control information is inconsistent with the set of bundling definitions, and in response to determination of inconsistent control information, adjust the state of subframe bundling and/or size of subframe bundled transmission in accordance with a predefined rule.

In accordance with a more detailed aspect adjustment of the state of subframe bundling comprises switching from a bundling state to a non-bundling state.

A set of bundling definitions may comprise at least one of allowed modulation and coding scheme index information and physical resource block allocation information. The adjustment of size of subframe bundled transmission may comprise dynamic modification of the modulation and coding scheme information and/or physical resource block allocation information.

In accordance with a detailed aspect, subsequent to reception of the inconsistent control information at a communication device, the inconsistent control information is modified to a form where it is compatible with a set of bundling definitions.

Control information relating to the number of allocated physical resource blocks may be modified by dividing the number of allocated physical resource blocks by the number of bundled subframes. Inconsistent value of modulation and coding scheme index and/or the number of allocated physical resource blocks for the bundling may be modified.

An inconsistent value for at least one parameter of the set of bundling definitions can be selected from an extended set of bundling definitions. The set of definitions may be provided by a first set of definitions on a relevant standard and/or protocol and/or specification or version thereof, and at least one parameter can be used from a second set of definitions, where the at least one parameter extends beyond the bundling limitations of the first set of definitions. The second set of definitions may comprise at least one of an extended set of allowed modulation and coding scheme index and extended number of allocated physical resource block combinations The control information may comprise uplink scheduling information that is deliberately made inconsistent with the set of bundling definitions to control subframe bundling of a physical uplink shared channel.

A base station such as an eNB or a communication terminal device such as a user equipment implementing the embodiments may also be provided.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which:

FIGS. 5 to 7 illustrate examples of interpretation of bundling information.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 and 2 to assist in understanding the technology underlying the described examples.

A non-limiting example of communication systems is the long-term evolution (LTE) of the Universal Mobile Telecommunications System (UMTS) that is standardized by the 3rd Generation Partnership Project (3GPP). A LTE base station is known as evolved or enhanced NodeB (eNB) in the vocabulary of the 3GPP specifications. LTE based systems can employ a mobile architecture known as the Evolved Universal Terrestrial Radio Access Network (E-UTRAN). Other examples of radio services providing a mobile device with access to a communication system include those provided by stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Figure 1:
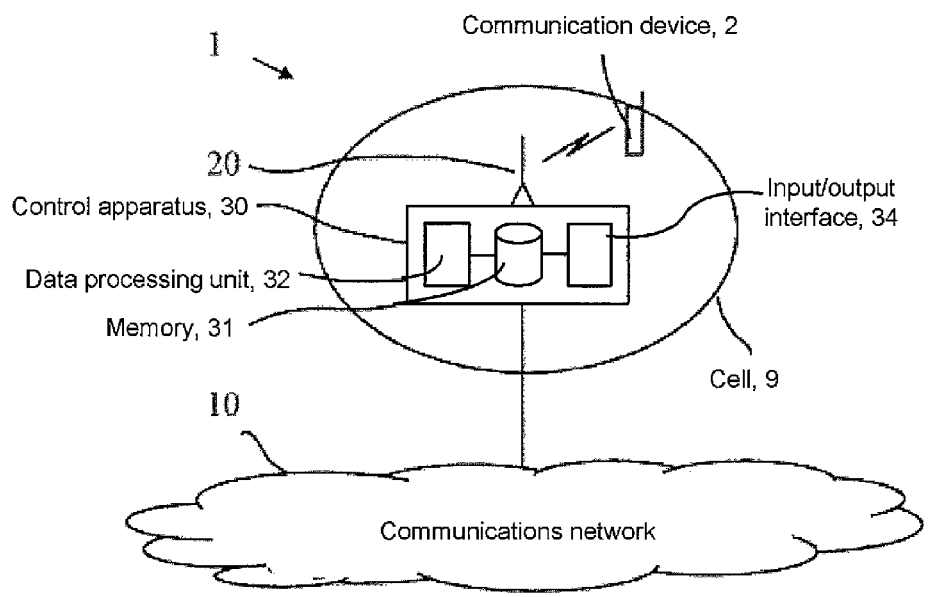
FIG. 1 shows an example of a communication system wherein below described examples of the invention may be implemented.

A mobile communication device 2 is typically provided wireless access via at least one access node such as a base station, a remote radio head or similar wireless transceiver node. In FIG. 1 base station 20 provides a radio service area or a cell 9 of a cellular system 1. The cell border is shown schematically by the oval shaped pattern only for illustration purposes. It is also noted that a great number of radio service areas may be provided in a cellular communication system, each cell may serve a number of mobile devices and that a mobile communication device may simultaneously be located in a plurality of cellular service areas. Also, a transceiver node site can provide more than one cell and/or a plurality of sectors, for example three radio sectors, each sector providing a cell or a sub radio service area of a cell.

A transceiver node is typically controlled by at least one appropriate controller so as to enable operation thereof and management of mobile communication devices in communication with the station. The control apparatus can be interconnected with other control entities. In FIG. 1 a control apparatus of base station 20 is shown schematically as being provided by block 30. The control apparatus and functions may be distributed between a plurality of control units. The control apparatus 30 can be arranged to process and/or control signalling and other communications by mobile communication devices in a service area of a station. The control apparatus 30 can be configured to provide control functions in association with subframe bundling. The control apparatus can control operation of mobile devices within its service area based on information communicated in accordance with certain embodiments described below, for example for dynamically switching between bundling states and/or adjusting transport block sizes. For providing the control the control apparatus 30 can comprise at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

In FIG. 1 example station 20 is connected to a wider communications network 10. A controller may be provided for coordinating the operation of the access systems. A gateway function may also be provided to connect to another network via the network 10. The other network may be any appropriate network. A wider communication system may thus be provided by one or more interconnect networks and the elements thereof, and one or more gateways may be provided for interconnecting various networks.

Figure 2:
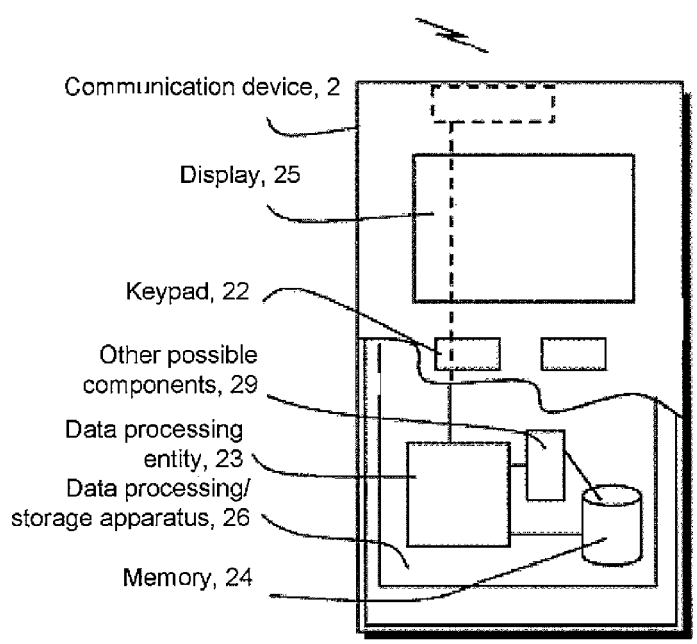
FIG. 2 shows an example of a communication device.

FIG. 2 shows a schematic, partially sectioned view of a communication device 2 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with stations of the network and other communication devices. The data processing, storage and other relevant control apparatus can be provided on an appropriate circuit board and/or in chipsets. This feature is denoted by reference 26. Data processing and memory functions provided by the control apparatus of the mobile device to cause control and signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device 2 may receive and transmit signals via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

The mobile device 2 is shown to be located close to the cell edge. Signal to Interference and Noise Ratio (SINR) range for medium data rate is relatively large considering cell edge conditions. For example, when 384 bit/s is carried with 4-6 PRBs, the corresponding average spectral efficiency (SE) is in the range of 0.3-0.5 bit/s/Hz. The relatively high operating range for SE (or SINR) may lead to problems discussed in the following.

The minimum resource allocation with subframe bundling can be e.g. 4 PRBs (4 ms (subframes)×180 kHz). For small packets, this is an unnecessarily large allocation, corresponding to spectral efficiency of 0.18 bit/s/Hz e.g. for a 144-bit packet. Considering the operation of an UE a more appropriate allocation could be 2×180 kHz×1 ms. So bundling may not be necessary for most small packets such as e.g. TCP ACK packets. On the other hand, in web browsing TCP ACKs dominate in terms of pure number of packets. If bundling is applied to all packets, then the spectral efficiency is severely reduced for majority of web browsing packets. A reason for this is that the configuration (ON/OFF) of TTI bundling can be is semi-static, and thus bundling cannot be applied selectively depending on e.g. the service type and/or on UE buffer status information. Also, current (LTE Release 8) TB size definition limits the effective coding rate (over bundled subframes) to 0.15 or below. An exception is single modulation and coding scheme (MCS) value (6) with one PRB allocation aimed for VoIP packet. However, this low coding rate may not be suitable for the SE (or SINR) operating range targeted with medium data rate subframe bundling.

Figure 3:
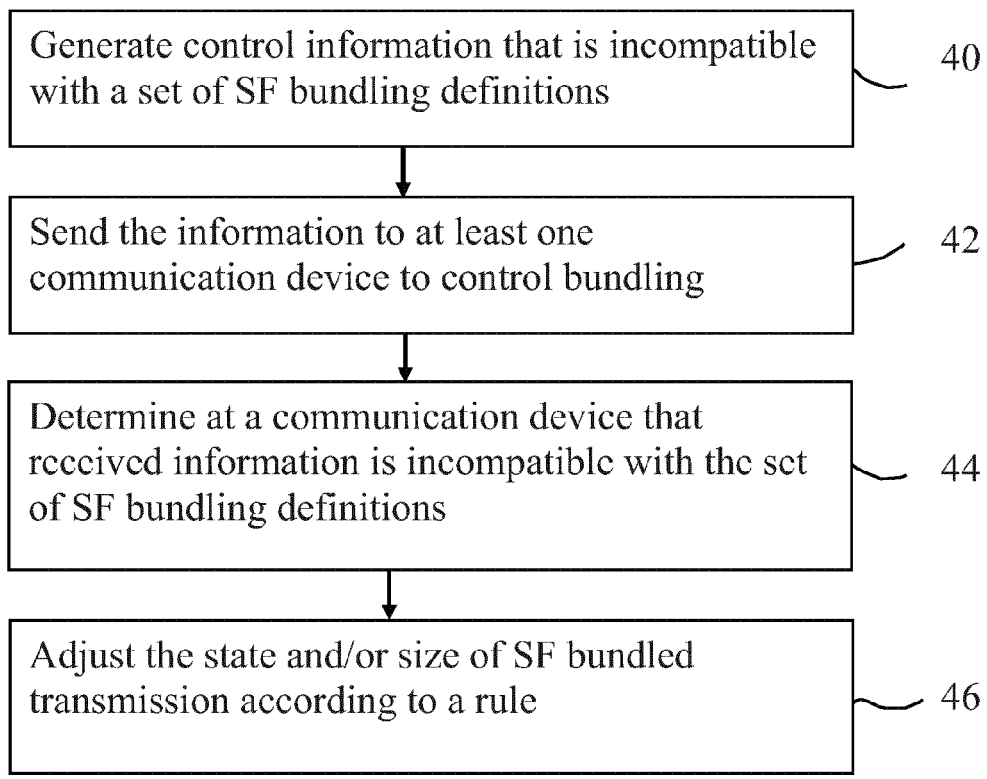
FIGS. 3 and 4 are flowcharts illustrating certain embodiments.

In accordance with an example a special signaling arrangement is provided when a user equipment is configured with subframe bundling via higher layers. General principles of such operation are illustrated by the flowchart of FIG. 3. In this operation control information is generated by a network entity at 40 for sending to at least one communication device configured to provide subframe bundling, the control information being generated such that at least part thereof is inconsistent with a set of definitions for subframe bundling. For example, the control information may be intentionally made inconsistent with LTE release 8 definitions, or particular definition of any other standard, protocol or specification or version thereof. The control information is signaled at 42 to the at least one communication device to adjust the state of subframe bundling and/or size of subframe bundled transmission in accordance with a predefined rule by the at least one communication device.

A communication device configured to provide subframe bundling then receives the at least partially inconsistent control information. The device determines at 44 whether the received control information is at least partially inconsistent with a set of definitions for subframe bundling the communication device is configured to provide. If the information is found to be inconsistent, the state subframe bundling and/or size of subframe bundled transmission is adjusted at 46.

A (first) set of definitions for subframe bundling may be provided based on a relevant standard and/or protocol and/or specification or version thereof. A (second) extended set of definitions can also be provided where at least one parameter extends beyond the bundling limitations of the original (first) set of definitions. The second set of definitions may comprise parameters such as an extended set of allowed MCS index and number of allocated PRB combinations. Use of parameters of the second set provides control instructions that are inconsistent with the first set.

An advanced TTI bundling operation may be provided e.g. in applications where a standard bundling mode can be provided for all UEs. Also, the bundling mode can be separately enabled with higher layer signaling. For example, dedicated radio resource control (RRC) signaling may be used for the purpose of controlling the enablement. A UE configured with the advanced TTI bundling can apply a special procedure for interpreting UL scheduling information. This can be done in response to receiving UL scheduling information where at least one field has a value that is inconsistent with predefined definitions by being an invalid value for subframe bundling. This can be used to enable faster link adaptation for bundling. For example, faster adaptation to traffic changes etc. may be provided.

TTI bundling can be configured dynamically e.g. such that it is enabled and/or disabled on a per subframe basis, allowing the bundling to be adapted to different conditions. For example, an appropriate state may be selected to adapt to different packet sizes. A special signalling arrangement can be provided for scenarios where a user equipment (UE) is configured with subframe bundling via higher layers. A device configured with advanced TTI bundling can apply a special procedure for interpreting uplink (UL) scheduling information if it receives UL scheduling information where at least one field has a value that is not valid for subframe bundling.

In accordance with an embodiment dynamic adjustment of bundling size or bundling override is provided by re-interpretation of Downlink Control Information (DCI) entries. The received UL scheduling information can contain, among other parameters, a modulation and coding scheme (MCS) index and number of allocated PRBs (N_PRB). MCS index defines used modulation order, redundancy version and TBS index (I_TBS). TB size is read from a table according to the TBS index and number of allocated PBRs.

When a device, for example a user equipment (UE) is configured to operate in a TTI bundling mode invalid MCS and TBS combinations can be formed, and these can be exploited in control of the bundling mode. These invalid states can be reused to indicate that the UE should temporarily abort the TTI bundling operation (i.e. to provide bundling override) and re-interpret the MCS/TBS and PRB allocation information to match the current UL transmission data rate requirements. The latter provides dynamic adjustment of bundling size. If valid UL scheduling information is received, UE transmits PUSCH transmission. PUSCH can be transmitted with or without subframe bundling depending on which field originally had an invalid value. Such re-interpretation of existing codepoints can be used to minimise signalling complexity.

UE and eNodeB can follow timing for HARQ feedback (carried e.g. on Physical HARQ Indicator Channel (PHICH), Physical Downlink Control Channel (PDCCH), enhanced PDCCH (ePDCCH)) as defined for subframe bundling even when Physical Uplink Shared Channel (PUSCH) is transmitted without subframe bundling.

Figure 4:
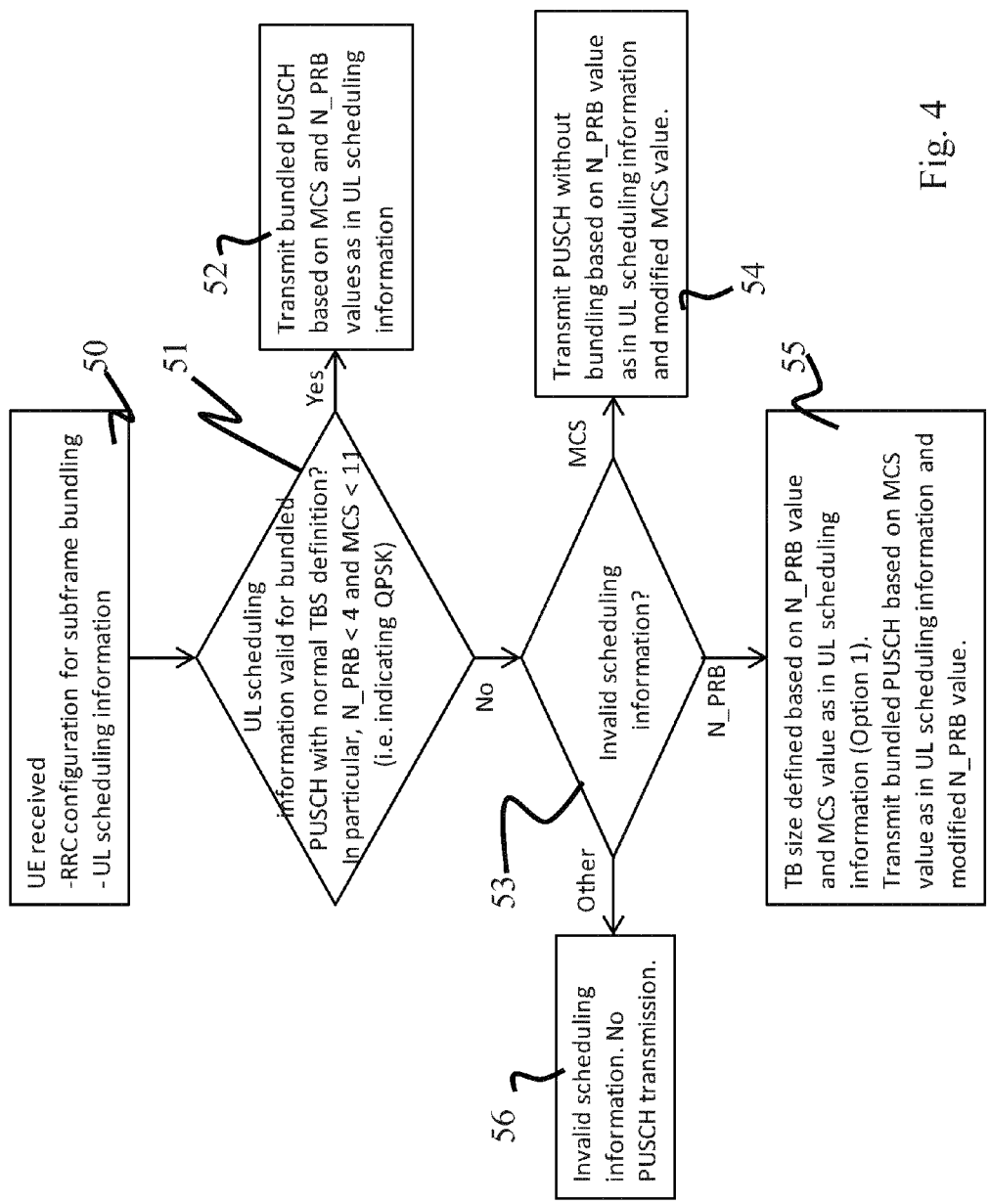

A detailed example is illustrated in the flowchart of FIG. 4. According to this example an UE can evaluate at 51 a RRC configuration for subframe bundling and UL scheduling information received at 50. If the information is valid, transmission of bundled PUSCH based on the received values follows at 52. Invalid UL scheduling information field in association with bundling mode can nevertheless be used for non-subframe bundling transmission. Thus, if invalid scheduling information is determined, see 53, the UE can interpret the invalid UL scheduling information field value according to predefined rules, use this modified field value (together with other UL scheduling information) to determine another parameter value, and use both the other parameter value and the modified field value in PUSCH transmission without subframe bundling, see block 54.

The UE can also evaluate if invalid UL scheduling information is valid for subframe bundled transmission with alternative TB size definition. If so, the UE defines at 55 TB size according to the alternative definition and modifies the invalid UL scheduling information value according to predefined rules, and uses both the determined TB size and the modified value in PUSCH transmission with subframe bundling.

In accordance with an option no PUSCH transmission takes place, see block 56. This can be so e.g. when the information cannot be interpreted at all. This may be the case, for example, when the control information inconsistent with the second, extended set of definitions for subframe bundling.

Figure 7:
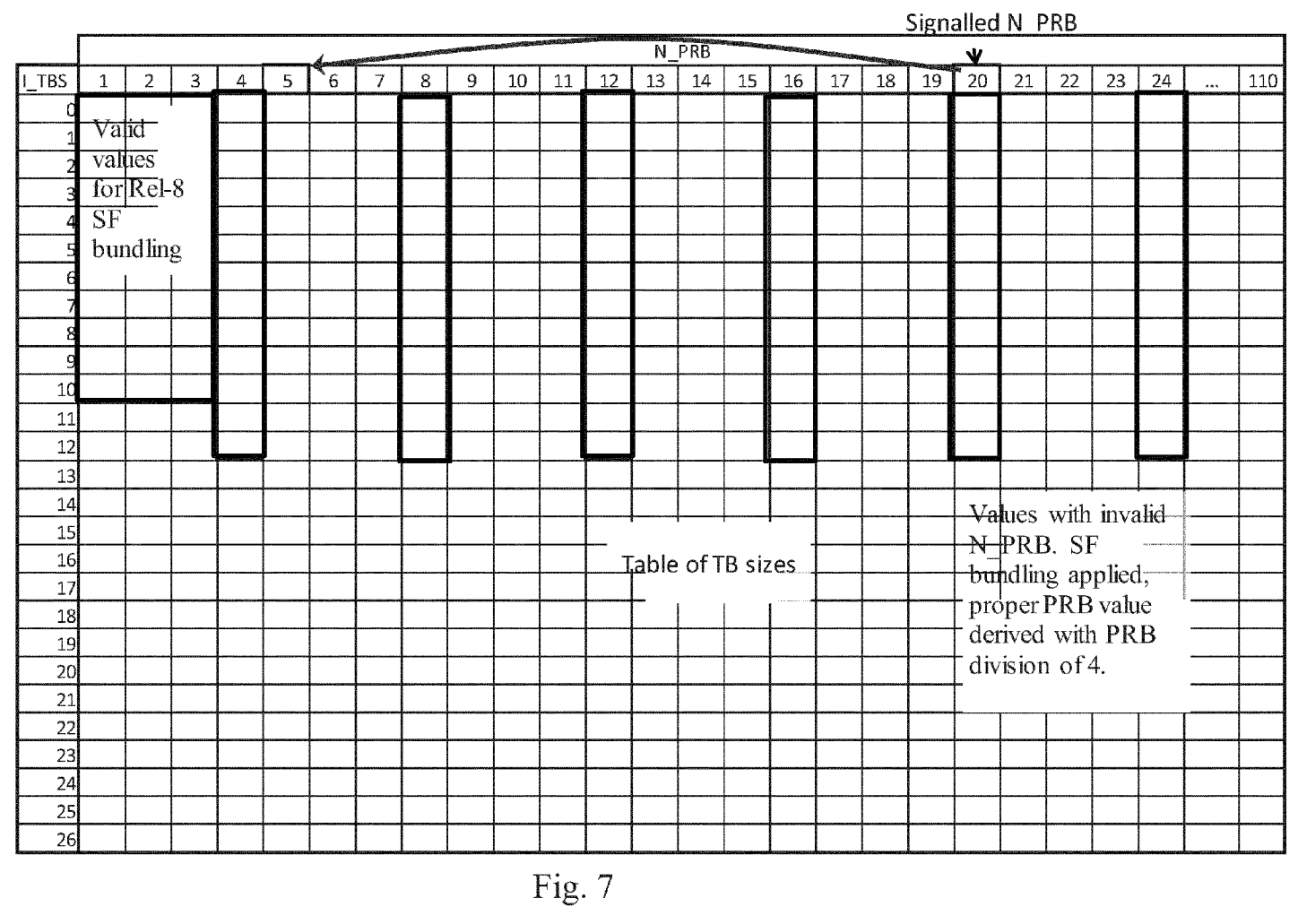

In accordance with a possibility the control information in accordance with the first set of definitions can be used as it is partially for its original purpose. A part of the control information can be modified, and then this modified/inconsistent part of the control information in accordance with the second set of bundling definitions can be used for providing functionalities that were not enabled by the first set of bundling definitions. For example, the inconsistent part can be used to define TB size, as shown in FIG. 7. The modified value can then be used to define the number of PRBs. Other functionality such subframe bundling state change may be provided in a similar manner.

According to a possibility, after inconsistent control information is received, it can be modified at the receiving device such that it can then be used in accordance with a set of acceptable definitions, e.g. a default set of bundling definitions or another predefined range of acceptable values. The modified control information can then be used exactly for the original purpose, after it has provided the additional control information not enabled by the original definitions and been modified back into an acceptable format. The additional control information can be e.g. that the TB size definition differs from default/first set definition, and/or that the redundancy version starting point in encoded bit circular buffer is different.

The procedure for controlling use of bundling can be provided in various manners. In accordance with an example related to dynamic configuration of PUSCH transmission without subframe bundling the MCS field is used for UL scheduling. A network entity, e.g. eNodeB can e.g. signal a MCS value corresponding to 16-QAM or 64-QAM. Neither of these is supported in LTE Release 8 subframe bundling. In that case, UE subtracts a predefined offset from the MCS value, and uses this modified MCS value (corresponding to QPSK) in PUSCH transmission. The modified MCS value is also used together with the signaled number of PRBs to determine appropriate TB size for non-bundled PUSCH transmission.

TB size may also be defined, based on the number of allocated PRBs in the UL scheduling information. When the eNodeB signals the number of allocated PRBs (N_PRB value) exceeding 3 PRBs (i.e. is not supported in LTE Release 8 subframe bundling), the following procedures can apply:

In accordance with Option 1 in block 55 of FIG. 4, the UE uses the TB size determined by the signaled N_PRB and MCS values in the bundled PUSCH transmission. The signaled N_PRB value is modified by dividing it with the number of bundled subframes.

Another option for the UE is to subtract a predefined offset from the N_PRB value, and use this modified N_PRB value in PUSCH transmission. The modified N_PRB value can be used together with MCS value to select a TB size that is then processed further, e.g. multiplied with number of bundled subframes to obtain appropriate TB size used in the bundled PUSCH transmission.

Figure 5:
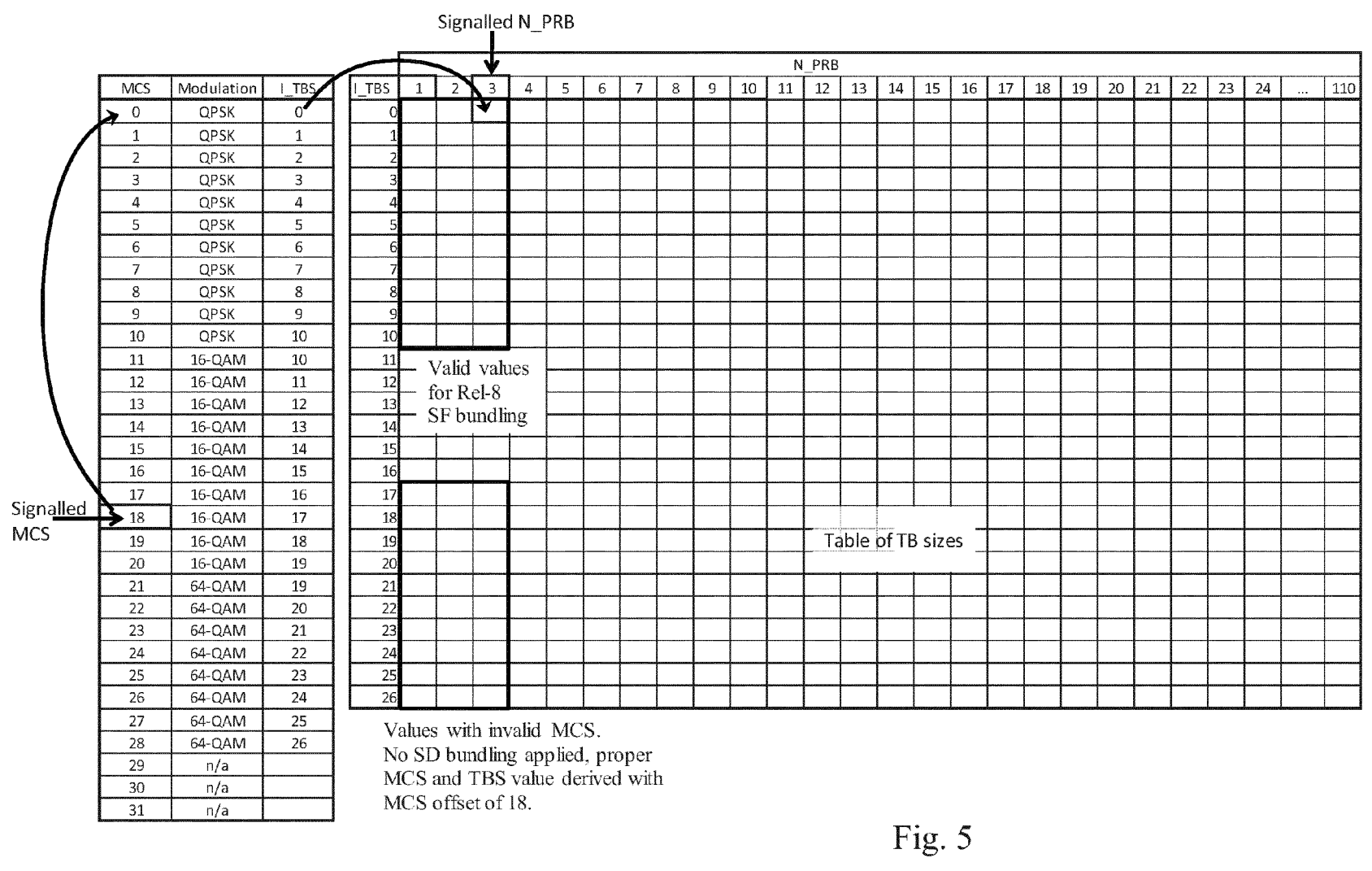
Figure 6:
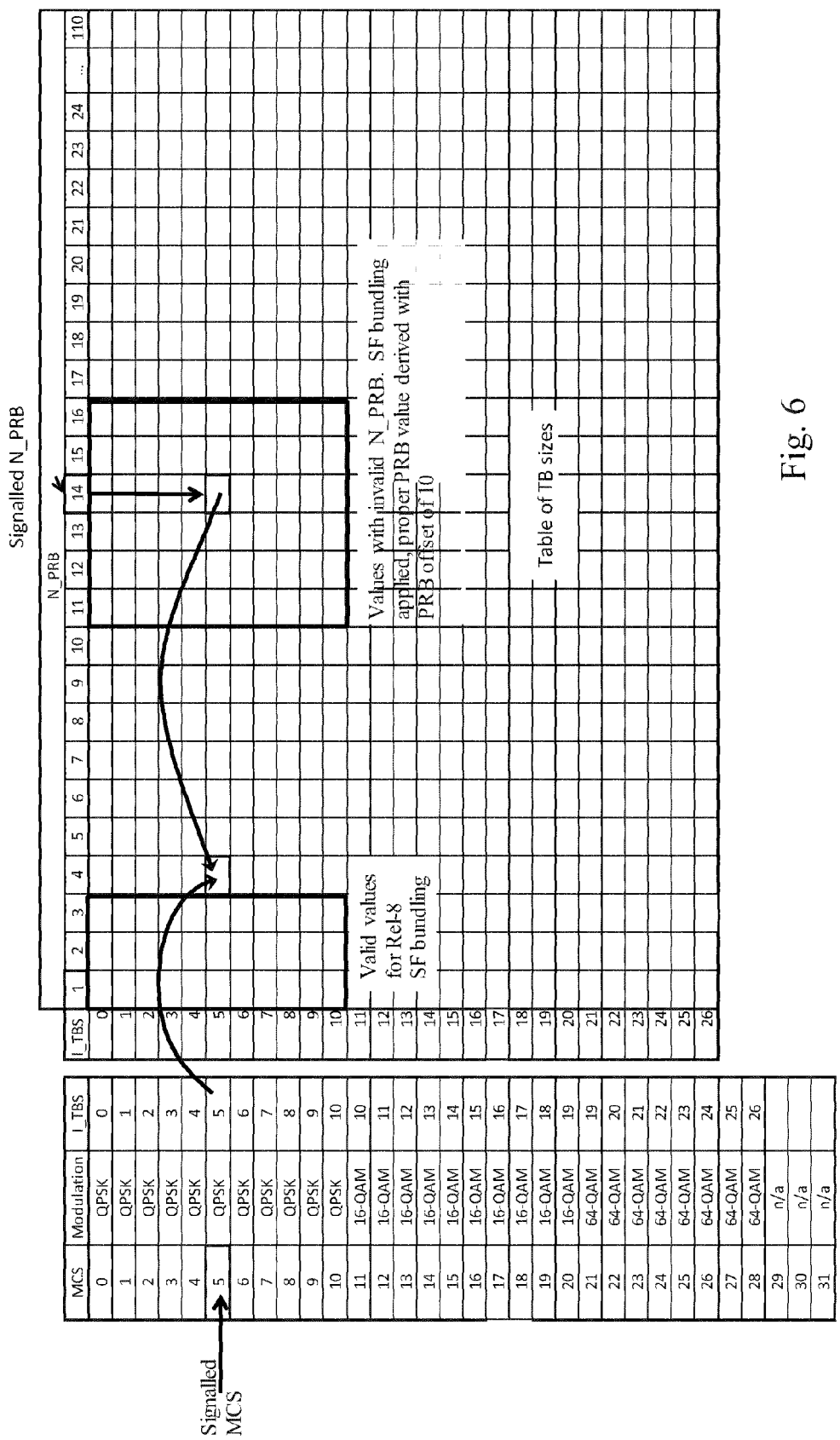

Examples for interpretation of invalided information in accordance with the latter option are shown in FIGS. 5 and 6. FIG. 7 shows the interpretation in accordance with Option 1.

In the example of FIG. 5 UE receives MCS value 18 and N_PRB value 3. As MCS 18 is an invalid value the UE switches the subframe bundling state to OFF, and modifies MCS value by applying MCS offset of 18. As a result a modified MCS value 0 is provided which the UE can use to determine modulation (QPSK) and TBS index (0). TBS index 0 and N_PRB value 3 are then used to determine TB size from a look-up table.

The values of MCS 18 . . . 28 and N_PRB 1 . . . 3 can be used to signal subframe bundling OFF state.

In accordance with the example of FIG. 6 an UE receives MCS value 5 and N_PRB value 14. N_PRB 14 is an invalid value, so N_PRB value is modified by applying N_PRB offset of 10. This results a modified N_PRB value 4. It is noted that the modified value does not need to match with values valid for Release 8 subframe bundling which the UE can use as number of PRBs in the transmission. The signaled MCS value 5 is used to determine modulation (QPSK) and TBS index (5). TBS index 5 and modified N_PRB value 4 are used to determine TB size from a look-up table. The obtained TB size, as the signaled N_PRB value was invalid, is then processed further, e.g. multiplied with number of bundled subframes to obtain an appropriate TB size for use in bundled PUSCH transmission.

Values of MCS 0 . . . 10 and N_PRB 11 . . . 16 can be used to signal adjustment on TB size determination for subframe bundling transmission.

In FIG. 7 example invalid N_PRB value of 20 is signaled. UE modifies this invalid value by dividing it by 4 and uses the modified N_PRB value 5 in the transmission. As the signaled N_PRB value was invalid, UE adjusts the TB size determination for subframe bundling transmission by using the signaled N_PRB and signaled MCS value to determine TB size from the look-up table.

It is noted that although in the above examples the set of bundling definitions is in accordance with LTE release 8 definitions where MCS<11 and N_PRB<4 these ranges and the used definitions can be different. For example, N_PRB<7 or larger. The exact values and parameters can depend on the standard, protocol and/or specification and the version thereof. Also, the inconsistency can be provided by use of the per se valid values in an inconsistent manner.

Indication of alternative TB size definition can trigger also other modifications in the PUSCH transmission generation. One such modification is the use of alternative L1 rate matcher (the difference can be e.g. different set of circular buffer starting positions for different TTIs or Redundancy Versions).

The various embodiments may provide various advantages. More efficient usage of subframe bundling may be provided, in particular for medium data rate communications. For power limited UEs, subframe bundling improves UL spectral efficiency and, secondly, reduces required PDCCH load for transmission of larger packets as larger TBs can be transmitted with one PDCCH grant. Dynamical switching between subframe bundled and non-bundled transmissions may be provided. This can be used to improve spectral efficiency for small packet transmissions. Subframe bundling may be targeted for cell edge UEs and bundling targeted for medium data rate can be flexibly handled within a single RRC configuration with simple PDCCH signaling. For example, HARQ timing and number of HARQ process can be kept unchanged for dynamically configured non-bundled PUSCH and thus the HARQ processing can be kept simple.

The required data processing apparatus and functions of a base station apparatus, a communication device and any other appropriate station or element may be provided by means of one or more data processors or other means arranged to provide the required functions. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that a TTI and a sub-frame can be seen as equivalent features and thus the terminology used in the description in this regard may be interchangeable. Also, the various examples above can be provided as alternatives or as complementary solutions. Whilst embodiments have been described in relation to communication system such as those based on the LTE systems and 3GPP based systems and certain versions thereof, similar principles can be applied to other communication systems. For example, this may be the case in applications where no fixed station equipment is provided but a communication system is provided by means of a plurality of user equipment, for example in ad hoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method for controlling subframe bundling in a system where subframe bundling is based on a set of bundling definitions, comprising
generating control information for at least one communication device configured to provide subframe bundling, wherein the control information is generated to be at least partially inconsistent with the set of bundling definitions, and
sending the control information to the at least one communication device to adjust a state of subframe bundling and/or a size of a subframe bundled transmission in accordance with a predefined rule by the at least one communication device.

2. A method as claimed in claim 1, wherein the adjusting the state of subframe bundling comprises switching from a bundling state to a non-bundling state.

3. A method as claimed in claim 1, wherein the set of bundling definitions comprises at least one of allowed modulation and coding scheme index information and physical resource block allocation information.

4. A method as claimed in claim 3, wherein the adjusting the size of subframe bundled transmission comprises dynamic modification of the modulation and coding scheme information and/or physical resource block allocation information.

5. A method as claimed in claim 1, wherein the control information comprises uplink scheduling information that is deliberately made inconsistent with the set of bundling definitions to control subframe bundling of a physical uplink shared channel.

6. A method as claimed in claim 1, wherein the set of bundling definitions limits a number of allocated physical resource blocks to less than four and/or a modulation and coding scheme index to less than eleven.

7. A method as claimed in claim 1, wherein the set of definitions is provided by a first set of definitions on a relevant standard and/or protocol and/or specification or version thereof, comprising use of at least one parameter from a second set of definitions, where the at least one parameter extends beyond the bundling limitations of the first set of definitions.

8. A method as claimed in claim 7, wherein the second set of definitions comprises at least one of an extended set of allowed modulation and coding scheme index and extended number of allocated physical resource block combinations.

9. A non-transitory computer readable medium comprising a computer program having code thereon, the code adapted to cause an apparatus to perform the steps of claim 1 when the program is run on a processor of the apparatus.

10. A method as claimed in claim 1, wherein, subsequent to reception of the inconsistent control information at a communication device, the inconsistent control information is modified to a form where it is compatible with a set of bundling definitions.

11. A method as claimed in claim 1, comprising modifying control information relating to a number of allocated physical resource blocks by dividing the number of allocated physical resource blocks by a number of bundled subframes.

12. A method as claimed in claim 1, comprising offsetting an inconsistent value of modulation and coding scheme index and/or a number of allocated physical resource blocks for the bundling.

13. A method for a communication device configured to provide subframe bundling based on a set of bundling definitions, comprising
determining that received control information is inconsistent with the set of bundling definitions, and
in response to the determination, adjusting a state of subframe bundling and/or a size of a subframe bundled transmission in accordance with a predefined rule.

14. A method as claimed in claim 13, wherein, subsequent to reception of the inconsistent control information at a communication device, the inconsistent control information is modified to a form where it is compatible with a set of bundling definitions.

15. A method as claimed in claim 13, comprising modifying control information relating to a number of allocated physical resource blocks by dividing the number of allocated physical resource blocks by a number of bundled subframes.

16. A method as claimed in claim 13, comprising offsetting an inconsistent value of modulation and coding scheme index and/or a number of allocated physical resource blocks for the bundling.

17. A non-transitory computer readable medium comprising a computer program having code thereon, the code adapted to cause an apparatus to perform the steps of claim 13 when the program is run on a processor of the apparatus.

18. A method as claimed in claim 13, wherein the adjusting the state of subframe bundling comprises switching from a bundling state to a non-bundling state.

19. A method as claimed in claim 13, wherein the set of bundling definitions comprises at least one of allowed modulation and coding scheme index information and physical resource block allocation information.

20. A method as claimed in claim 19, wherein the adjusting the size of subframe bundled transmission comprises dynamic modification of the modulation and coding scheme information and/or physical resource block allocation information.

21. A method as claimed in claim 13, wherein the control information comprises uplink scheduling information that is deliberately made inconsistent with the set of bundling definitions to control subframe bundling of a physical uplink shared channel.

22. A method as claimed in claim 13, wherein the set of bundling definitions limits a number of allocated physical resource blocks to less than four and/or a modulation and coding scheme index to less than eleven.

23. A method as claimed in claim 13, wherein the set of definitions is provided by a first set of definitions on a relevant standard and/or protocol and/or specification or version thereof, comprising use of at least one parameter from a second set of definitions, where the at least one parameter extends beyond the bundling limitations of the first set of definitions.

24. A method as claimed in claim 23, wherein the second set of definitions comprises at least one of an extended set of allowed modulation and coding scheme index and extended number of allocated physical resource block combinations.

25. An apparatus for controlling subframe bundling in a system where subframe bundling is based on a set of bundling definitions, the apparatus comprising at least one processor, and at least one memory including computer program code, wherein the at least one memory and the computer program code are configured, with the at least one processor, to
   generate control information for at least one communication device configured to provide subframe bundling, wherein the control information is generated to be at least partially inconsistent with the set of bundling definitions, and
   cause sending of the control information to the at least one communication device to adjust a state of subframe bundling and/or a size of a subframe bundled transmission in accordance with a predefined rule by the at least one communication device.

26. An apparatus as claimed in claim 25, configured to cause switching from a bundling state to a non-bundling state based on the inconsistent control information.

27. An apparatus as claimed in claim 25, wherein the set of bundling definitions comprises at least one of a set of allowed modulation and coding scheme index and physical resource block allocation information.

28. An apparatus as claimed in claim 25, configured to adjust the size of subframe bundled transmission by dynamic modification of the modulation and coding scheme information and/or physical resource block allocation information.

29. An apparatus as claimed in claim 25, wherein the set of definitions is provided by a first set of definitions on a relevant standard and/or protocol and/or specification or version thereof, the apparatus being configured to use at least one parameter from a second set of definitions, where the at least one parameter extends beyond the bundling limitations of the first set of definitions.

30. An apparatus as claimed in claim 29, wherein the second set of definitions comprises at least one of an extended set of allowed modulation and coding scheme index and extended number of allocated physical resource block combinations.

31. An apparatus for a communication device configured to provide subframe bundling based on a set of bundling definitions, the apparatus comprising at least one processor, and at least one memory including computer program code, wherein the at least one memory and the computer program code are configured, with the at least one processor, to
   determine that received control information is inconsistent with the set of bundling definitions, and
   in response to determination of inconsistent control information, adjust a state of subframe bundling and/or a size of a subframe bundled transmission in accordance with a predefined rule.

32. An apparatus as claimed in claim 31, configured to cause switching from a bundling state to a non-bundling state based on the inconsistent control information.

33. An apparatus as claimed in claim 31, wherein the set of bundling definitions comprises at least one of a set of allowed modulation and coding scheme index and physical resource block allocation information.

34. An apparatus as claimed in claim 31, configured to adjust the size of subframe bundled transmission by dynamic modification of the modulation and coding scheme information and/or physical resource block allocation information.

35. An apparatus as claimed in claim 31, wherein the set of definitions is provided by a first set of definitions on a relevant standard and/or protocol and/or specification or version thereof, the apparatus being configured to use at least one parameter from a second set of definitions, where the at least one parameter extends beyond the bundling limitations of the first set of definitions.

36. An apparatus as claimed in claim 35, wherein the second set of definitions comprises at least one of an extended set of allowed modulation and coding scheme index and extended number of allocated physical resource block combinations.

* * * * *